May 15, 1928.

J. D'ASSELER 1,670,099

WIND MOTOR

Filed May 7, 1926

2 Sheets-Sheet 1

Fig. 1.

Inventor:
Jules D'Asseler
per: [signature]
Attorney.

May 15, 1928.
J. D'ASSELER
WIND MOTOR
Filed May 7, 1926
1,670,099
2 Sheets-Sheet 2
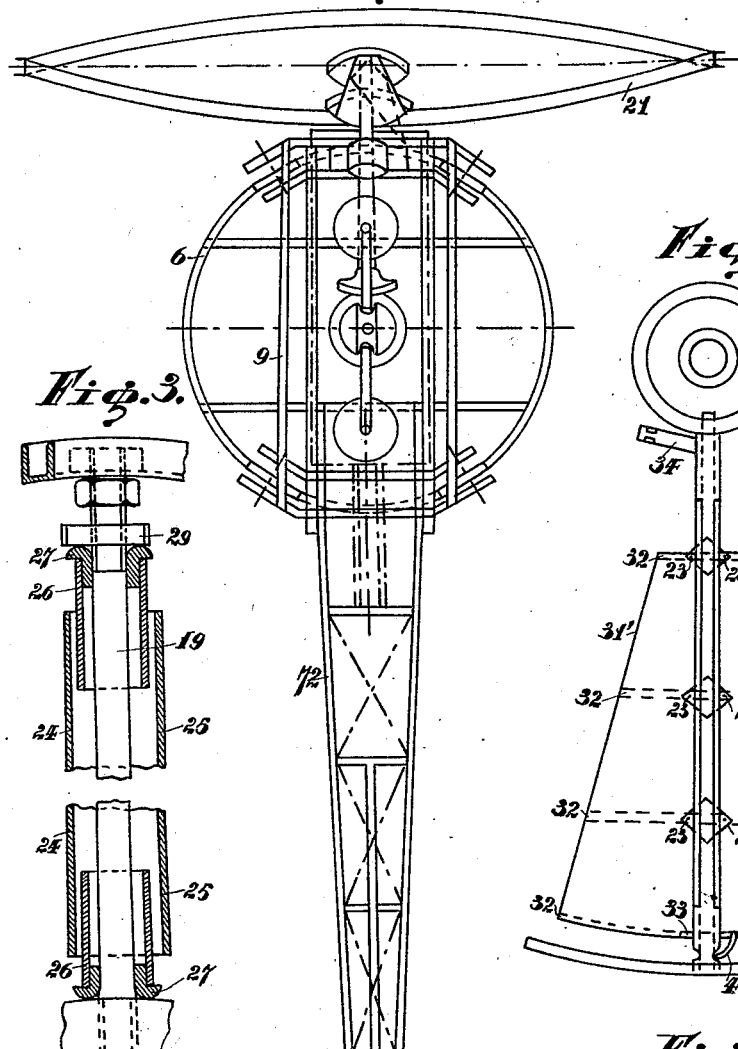
Inventor:
Jules D'Asseler
per: [signature]
Attorney.

Patented May 15, 1928.

1,670,099

UNITED STATES PATENT OFFICE.

JULES D'ASSELER, OF GHENT, BELGIUM.

WIND MOTOR.

Application filed May 7, 1926, Serial No. 107,530, and in Belgium March 20, 1925.

The present invention relates to wind-motors of the type wherein the shaft carrying the vane-wheel is, in order to secure the orientation of the latter according to the direction of the wind, mounted on a turning carriage capable of rotating on a circular rail provided at the top of a tower, and about the vertical axis of a central shaft for the transmission of the power developed by the vane-wheel, the said shaft extending centrally through the tower.

The improvement according to the present invention may be advantageously applied to wind-motors provided with any kind of regulating device influenced by a centrifugal governor, and comprising a vane-wheel with multiple vanes capable of pivoting about a radial axis of the wheel and of which the position is controlled by the reaction of the aforesaid regulating device through the medium of suitable connecting members.

A wind-motor, in order to be a really useful apparatus, must among other conditions be capable of working day and night in all weathers without supervision, and must not be limited to a reduced size, so as to constitute an efficient source of energy. Besides being of strong construction, it should be of sufficient sensibility to be capable of utilizing winds even of small intensity and to respond in a rapid and efficient manner to any variations in the force of the wind, so as to constitute a source of energy as constant as possible and to avoid destructive effects in extreme conditions.

It is when the wind is strongest that a wind-motor should render the greatest services, but this object can only be attained if the apparatus is capable of resisting sudden gusts of wind. What is most dangerous for a wind-motor is generally not the violence of a regular wind, but the gusts of wind during which the intensity of the wind increases with great rapidity and attains a power to which hardly anything is capable of resisting. As a wind-motor cannot escape sudden gusts of wind if it has to operate in a continuous manner, the ideal is to design an apparatus capable of resisting the destructive effect of gusts of wind while being readily responsive to the changes in the direction of the wind and capable, in view of the possibilities of adjustment of the position of the vanes of the vane-wheel, to maintain notwithstanding the gusts of wind a more or less constant speed.

With these objects in view, the improvement according to the invention comprises an arrangement of the vanes of the vane wheel enabling the said vanes to respond with a maximum of facility and rapidity to the influence of the regulating device, so as to enable the latter to intervene efficiently and thereby to secure a great sensibility of the apparatus.

In view of the reinforced construction of the vane wheel, the apparatus is not limited to restricted dimensions, and the absence of any delicate part ensures a maximum of resistance of the construction.

It will be readily understood that it is essential to steady the movable vanes of the vane wheel so as to prevent them from being completely reversed about their axis under the influence of a particularly sudden and strong gust of wind. This object is according to the invention attained by means of abutments provided on the circumference of the vane wheel to limit the two extreme positions which the vanes of the said wheel are allowed to take, and one of the most important features of the invention resides in the application of a return and steadying device comprising two sets of springs of which the first tends to bring back the vanes to the position wherein their whole surface is exposed to the action of the wind from the position in which they only offer their edge to such action under the influence of the regulating device, while the springs of the second set are arranged so as to maintain in the required relative position the parts which connect each vane to an element capable of sliding axially in relation to the vane wheel and through which the influence of the regulating device is imparted to the vanes.

A wind-motor embodying the improvements according to the invention is, by way of example only, illustrated by the accompanying drawings wherein:

Fig. 1 is a vertical elevation of the improved wind-motor according to the invention, Fig. 2 is a view of the said wind-motor seen from above, and Figs. 3 and 3ª and 4 and 4ª illustrate details of portions of the reinforced vane-wheel provided according to the invention.

Referring to the said drawings, the wind-motor comprises a steelwork tower 1 at the top of which is secured a central vertical tubular member 2, within which rotates a solid shaft 3 having keyed on its upper end a bevel pinion 4 in mesh with a bevel wheel 17 keyed onto the shaft 14 carrying the vane-wheel, so that the pinion 4 transmits to the vertical shaft 3 the power developed by the wind-motor. The shaft 14 is preferably inclined about 8° to the horizontal.

To the upper end of the tower are secured four channel members 5 of which two are placed immediately above the two others and at right angles to the latter. On the said members is supported a circular rail 6 of large diameter so as to overhang to a considerable extent outside and all around the square horizontal section of the top of the tower 1.

On this circular rail 6 is able to turn a carriage comprising two parallel channel members 9 at the front and rear ends of which are secured pairs of short cross members 7 and 8 respectively serving as bearings for sets of small wheels or rollers 11. Between the two members 9 and a pair of transverse members 12 extending at right angles to the said members 9, is secured a block 13 serving to maintain the tubular member 2 which extends through the said block. It will thus be understood that the structure constituted by the parts 7, 8, 9, 10, 11, and 12 is capable of rotating about the centre of the tubular member 2.

The carriage carries the inclined vane-wheel shaft 14, which rotates in two ball bearings 15 and 16 of which the first is placed to the fore of the carriage as near as possible to the vane wheel, and the second slightly to the rear of the centre of the carriage.

The vane-wheel carried by the shaft 14 comprises a hub 18 reinforced at both of its ends by an integral flange 30, 31 situated in a plane perpendicular to the axis of the shaft 14 and the hub 18. To the outer flange 30 are secured multiple spokes 19 extending at right angles to the axis of the hub, while to the inner flange 31 are secured corresponding reinforcing spokes 20 extending at an angle in relation to the main spokes 19 and to the axis of the hub 18. In order to improve the rigidity of the wheel, the spokes 19 and 20 are interconnected by intermediate members 22, and their outer ends are inserted in a circumferential metal rim 21 of channel cross section.

Each vane 31' is constituted by a thin sheet of metal having the shape indicated in Fig. 3 and of which the rigidity is reinforced by transverse reinforcing members 32 applied on the outer face of the vane. The vanes 31' are secured to supporting members 24 constituted by channel irons, by means of lozenge-shaped fixing plates 28 of which the number equals that of the transverse reinforcing members 32, the said fixing plates having in their portion projecting on each side of the web of the channel 24 a hole for the passage of a bolt 23 for securing the vanes 31', the said bolts passing through the members 32. Within the members 24 and at each end thereof are provided tubular end pieces 26, in which are inserted flanged sleeves 27, preferably made of brass, the said end pieces 26 surrounding the corresponding main spoke 19 so as to enable the whole of the vane to rotate about the said spoke. The end pieces 26 and the parts carried thereby are maintained between the circumference of the outer flange 30 of the hub 18 and an adjusting nut 29 screwed onto a threaded portion of the spoke 19 close to the circumferential rim 21.

The outer edge of each vane 31' is secured to the corresponding tubular end piece 26 by means of a strap or clamp 33 bolted to the vane 31' and to the transverse member 32 bordering the outer edge of the said vane.

The reinforced construction of the vanes which has been described makes it possible to obtain an absolute rigidity of the whole structure and a maximum of resistance, while allowing the vanes a great movability which renders the apparatus very responsive to regulation.

At the centre of the vane wheel there is left an open space equal to about a third of the whole diameter of the wheel, this space allowing the passage of the wind to enable the latter to act on a rudder to which reference will be made at a later stage.

Close to the hub 18, the supporting member 24 carrying each vane 31' is provided with a rigid operating arm 34 which is connected by a link 35 to an integral flange sleeve 36 mounted on the shaft 14 and which is engaged internally by a key 37 so that the said sleeve 36 rotates with the shaft 14 while being capable of sliding along the latter. The said sleeve 36 has a circumferential groove in which engages a collar 38 connected to two connecting rods 39 suitably guided and extending parallel to the axis of the shaft 14. In order to obtain the automatic regulation of the apparatus, the said connecting rods are operated through the medium of any suitable device (for instance by means of rod-connections and bell crank levers) by the movements of the sleeve 64 of a centrifugal ball governor 77 mounted on a vertical shaft 54 extending above and in alinement with the central shaft 3, the rotation of the shaft 14 being imparted to the said governor shaft 54 through the medium of any suitable movement transmitting means, such as for instance gearing 55 engaging on the one hand the bevel wheel 17 and on the other hand a spur pinion 63 keyed onto the shaft 54. The shafts carrying the gearing 55 and the spur pinion 63 are supported by metal members 52 and 53 forming with uprights 12' to which their ends are secured, a metal bridge mounted on the carriage 9.

In order to secure the return of the vanes 31' to the position in which they are exposed to the action of the wind when the velocity of the latter decreases and the action of the governor ceases from drawing the flanged sleeve 36 away from the hub 18, a set of return coil springs 44, within which extends a slack cable 45, are attached on the one hand to a fixing disc 43, rigidly mounted on the outer end of the shaft 14 and on the other hand to the point of connection of the arms 34 with the links 35, so as to avoid any possibility of reversal of the relative angular position of the said parts 34 and 35 when the vanes are subjected to a particularly sudden and strong gust of wind tending to cause them to be reversed completely about their axis, although such complete reversal is prevented after the vanes have reached the extreme position allowed by the abutments previously referred to. These abutments comprise an abutment 47 secured in a suitable position to the circumferential rim 21, and a spur 46 secured to the corresponding reinforcing spoke 20 adjacent the said ring 21, as shown in Figure 4. Furthermore, in order to steady the vanes and keep the parts in the required relative position, a set of steadying coil springs 42 are attached on the one hand to aforesaid fixing disc 43 and on the other hand to the flange of sleeve 36, said springs 42 tending to bring the sleeve 36 back towards the hub 18.

The described apparatus is completed by a rudder tail including a frame 72 attached by means of bolts 73 and 74 to the members 9 of the carriage and by means of bolts 75 to the upper portion of the bridge 12', 52, 53 previously mentioned. The said frame carries a vertical rudder 76, and the action of the wind on the latter causes the rotation of the carriage 9 carrying the complete apparatus about the tubular member 2 so as to maintain automatically the vane wheel in the position in which it is exposed to the full action of the wind.

The whole central mechanism should preferably be covered by a sheet metal casing, in order to protect it against weather conditions, and the bearings 15 and 16 should be similarly protected against penetration of water.

I claim:—

In a wind-motor of the type set forth, comprising a vane-wheel with pivoted vanes on a shaft carried by a turning carriage, and means influenced by centrifugal force for adjusting the angular position of the vanes according to the velocity of the wind, abutments on the rim of the wheel, for limiting the two extreme angular positions of each vane, a disc secured to the outer end of the vane-wheel shaft, a set of coil springs attached on the one hand to the said disc and on the other hand to the slidable collar on the vane-wheel shaft and forming a part of the aforesaid means influenced by centrifugal force, and a second set of coil springs attached on the one hand to the aforesaid disc and on the other hand to a rigid operating arm fixed to the respective vanes, and pivotally connected with said slidable collar, substantially as described.

In testimony whereof I signed hereunto my name.

J. D'ASSELER.